Jan. 6, 1959  R. M. ANRIG  2,867,390
SPOOL TRAILER
Filed June 29, 1956  3 Sheets-Sheet 1
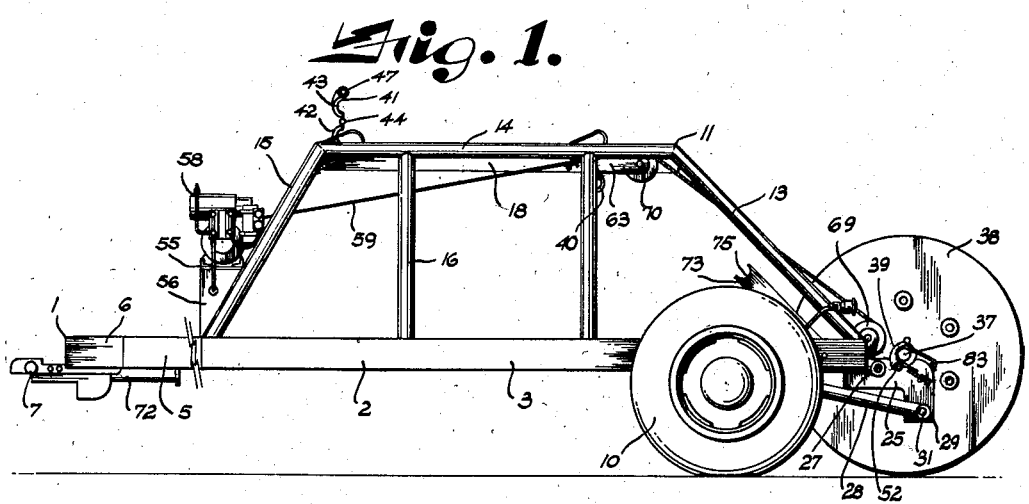
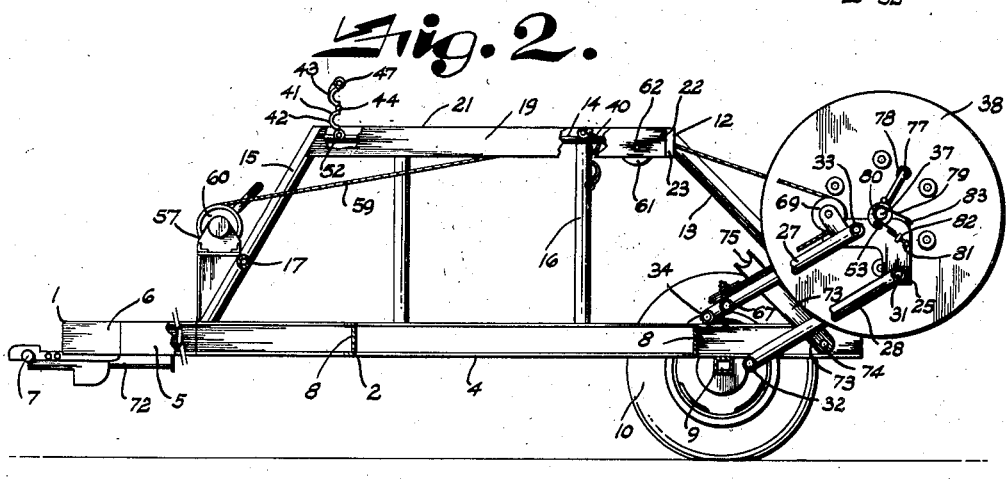
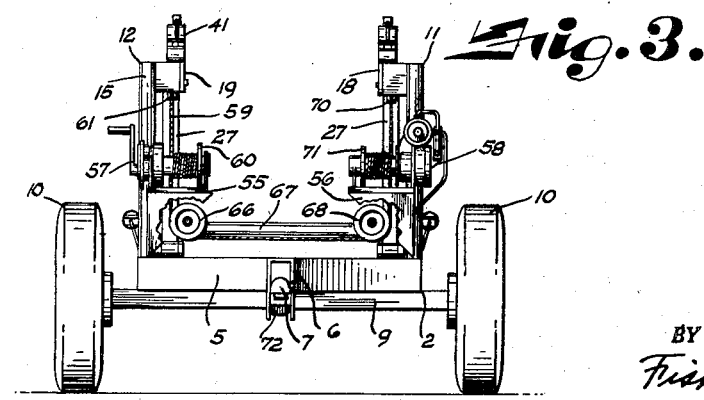
INVENTOR.
Robert M. Anrig.
BY
ATTORNEYS.

Jan. 6, 1959 R. M. ANRIG 2,867,390
SPOOL TRAILER
Filed June 29, 1956 3 Sheets-Sheet 2

INVENTOR.
Robert M. Anrig.
BY
Fishburn and Gold
ATTORNEYS.

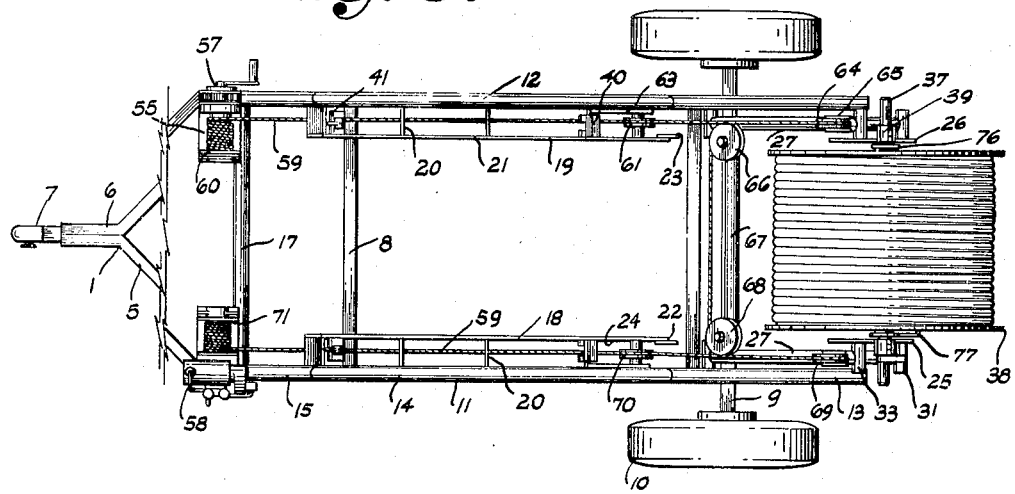
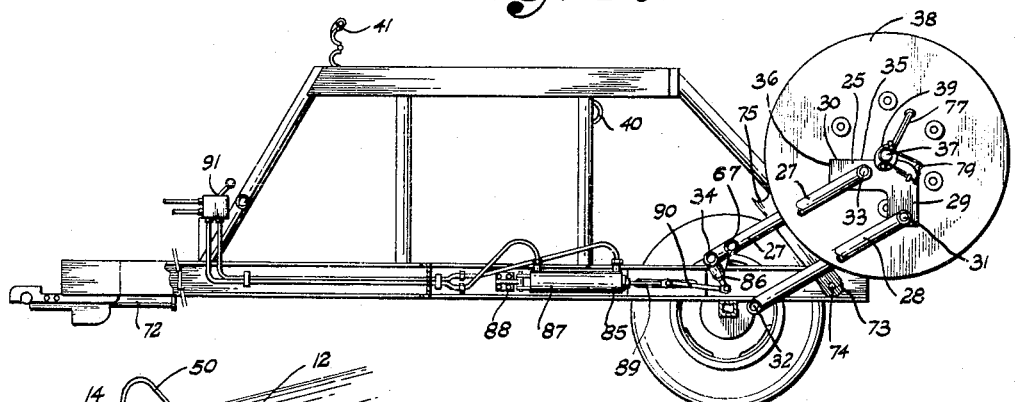
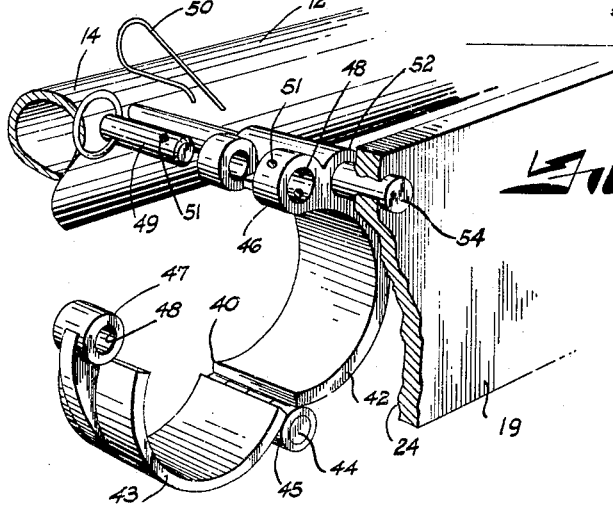
INVENTOR.
Robert M. Anrig.
BY
Fishburn and Gold
ATTORNEYS.

United States Patent Office 2,867,390
Patented Jan. 6, 1959

2,867,390

SPOOL TRAILER

Robert M. Anrig, Ottawa, Kans.

Application June 29, 1956, Serial No. 594,949

8 Claims. (Cl. 242—86.5)

This invention relates to vehicular structures adapted to be used in connection with the loading, transporting and unloading of cable spools or reels and the unreeling of cable from spools thereon.

It is common practice for utility and construction companies to use trailers for transporting conduit and cable spools wherein only one spool is carried at a time, or structures having cradles for receiving the spools wherein separate hoists must be used for hoisting the spools into the cradles. With such structures, it is common practice to have other or separate equipment to hold the spool while the cable is being unreeled therefrom.

The principal objects of the present invention are to provide a novel spool carrier for holding one or more cable spools with a lift mechanism preferably supported upon the chassis for lifting the spools from any lower level to position where the spools can be rolled into carrying position; to provide a spool trailer with a super-structure which includes two horizontal spaced apart top rails with spool spindle receiving saddles for supporting the ends of such spindles and the spool thereon; to provide such a structure with a hoist having parallel links pivoted to opposite sides of the trailer frame with their outer ends pivoted to parallel carrier members and elevating means to operate the links to raise the carriers into alignment with the top rails of the trailer super-structure; to provide such a structure with hoist operating means that is selectively power or manually operated; to provide such a parallel link spool lifting means with associated structure whereby a spool may be transported thereon; to provide such a spool carrying structure wherein the spool is held against rotation relative to the spindle with brake means for retarding the rotation of the spindle for controlling the tension on a cable payed out from the spool on the trailer; and to provide a spool trailer which may be built economically on a production basis that is strong and durable and more efficient in operation in the handling of cable spools and the cable or conduit thereon.

In accomplishing these and other objects of the present invention, I have provided improved details of structure, the preferred forms of which are illustrated in the accompanying drawings, wherein:

Fig. 1 is a side elevation of a spool trailer with the spool elevating device in lowered position.

Fig. 2 is a side elevation of a spool trailer with the spool elevating device in partially raised position, and portions broken away to illustrate the structure thereof.

Fig. 3 is a front elevation of the spool trailer.

Fig. 6 is a plan view of the spool trailer.

Fig. 7 is an enlarged partial perspective view of a spool spindle saddle in open position.

Fig. 8 is a view of the spool trailer similar to Fig. 2 and with a modified form of lift operating structure.

Figure 4:
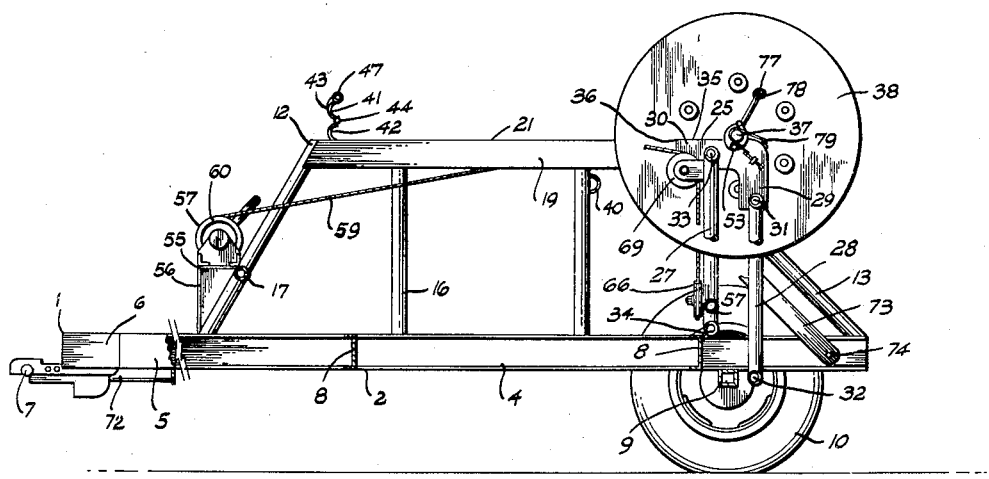
Fig. 4 is a side elevation similar to Fig. 2 with the spool elevating device in fully raised position.

Referring more in detail to the drawings:

1 designates a spool trailer embodying the features of the present invention which includes a main frame 2 preferably fabricated from structural steel and comprising substantially parallel side beams 3 and 4 with converging portions 5 at their forward ends that are connected as at 6 and secured to a conventional hitch 7 of any desired type for connection of the trailer to a suitable towing vehicle (not shown). The rear portions of the side beams 3 and 4 are connected by a transverse member 8 preferably spaced slightly forwardly of an axle 9 which has ground-engaging wheels 10 at opposite ends thereof. In the illustrated structure, the axle 9 is shown as being rigidly secured to the side beams 3 and 4; however, it is to be understood that conventional elliptical springs or the like may be utilized for connecting the axle 9 to the frame members. Additional transverse members 8 may be positioned as desired forwardly of the one illustrated in Fig. 2 for increased strength and rigidity, particularly in long trailers for carrying three or more spools, but it is preferable that no transverse frame members be arranged between the members 3 and 4 to the rear of the axle 9 whereby spools to be transported may be moved between the rear portion of said members 3 and 4.

Side frames or super-structures 11 and 12 extend upwardly from the side beam members 3 and 4 respectively to form what may be termed spaced apart super-structure panels which in the illustrated structure are formed of tubular members with each panel including a rear member 13 having its lower end secured to the rear portion of the side beams and extending upwardly and forwardly therefrom and connected to a horizontal longitudinal member 14 which has its forward end connected to the upper end of a downwardly and forwardly inclined member 15 whose lower end is preferably rigidly secured to the side beams adjacent the forward end of the parallel portion thereof. Suitable upright members 16 have their ends connected to the side beams and the horizontal member 14 to support the intermediate portion thereof, the number of upright members 16 varying with the length of the trailer. The lower portions of the members 15 are connected by a transverse member 17 to add rigidity to the frame and super-structure which is open to the rear. Horizontal spaced apart top rails 18 and 19 preferably in the form of flat plates arranged in vertical planes are rigidly secured to the panel members 14 by a plurality of spaced brackets 20 with the upper edges 21 of the rails 18 and 19 defining tracks which are preferably horizontal and substantially in the same elevation as the upper surface of the members 14. The rails 18 and 19 terminate at their rear ends as at 22 and have extension members 23 secured to the outer surfaces 24 of said rails to serve as guides as later described.

Spool carriers 25 and 26 preferably in the form of plates are supported in the same planes as the rails 18 and 19, each plate being supported by a pair of links 27 and 28. The plates 25 and 26 are preferably L-shaped with a vertical arm 29 terminating at its upper end in a horizontal arm 30. The lower end of the vertical arm 29 is pivotally connected as at 31 with the outer end of the link 28, the other end of the link 28 being pivotally mounted as at 32 on the side beam of the frame 2 rearwardly of the axle 9. The arm 30 is pivotally connected intermediate its length as at 33 with the upper or outer end of the link 27 and the other end of the said link is pivotally mounted as at 34 preferably above the side beam and slightly forwardly of the axle 9 as illustrated in Fig. 2, the spacing between the pivotal mountings 32 and 34 corresponding to the spacing between the pivotal connections 31 and 33 whereby the links 27 and 28 for the respective carriers 25 and 26 are parallel, and the length of the links is such that the outer ends of both extend rearwardly of the frame side beams as illustrated in Fig. 1 when in lowered position at which position the upper edges 35 of the arms 30 form tracks which are substantially in horizontal position or parallel with the upper edges 21 of the rails 18 and 19, and when the carriers are elevated by swinging the links 27 and 28 upwardly and forwardly the forward ends 36 of the arms 30 abut the rear ends 22 of the rails 18 and 19 with the forward portions of said arms 30 engaging on the inside of the extensions 23 to prevent lateral shifting of the carriers. When the carriers are in lowered position as shown in Fig. 1, the upper edges 35 of the arms 30 are below the axle or spindle member 37 of spools 38 adapted to be carried on the spool trailer whereby a spool may be rolled on the ground to position the spindle above the arms 30 of the carriers.

The carriers 25 and 26 each have a spool spindle saddle 39 mounted thereon and a saddle 40 of substantially the same construction as the saddle 39 is mounted adjacent the rear portion of the rails 18 and 19, and in the particular structure illustrated where the trailer is designed to carry three spools, a saddle 41 is mounted adjacent the forward end of each of the rails 18 and 19. If it is desired to carry more spools, the trailer would be lengthened and additional saddles 40 arranged on the rails 18 and 19. The saddles 39, 40 and 41 preferably consist of pairs of arcuate members 42 and 43 each substantially semicircular with adjacent ends pivotally connected by a hinge pin 44 extending through ears 45 on the sections. The opposite ends of the sections have mating ears 46 and 47 with bores 48 adapted to be aligned to receive a pin 49 to hold the sections together and a keeper 50 is arranged to extend through an aperture 51 in the pin extending from the ears 46 to retain the sections in position to embrace the cable spool spindle. The saddles 39 have ears 52 on the section 42 pivotally mounted on pins 53 in the arms 30 below the edges 35 so that when the saddles are opened, the entire saddle may be positioned below the upper edge 35 of the arms 30 of the carriers 25 and 26. The saddles 40 are mounted on the rails 18 and 19 by pins 54 whereby the saddles 40 may be swung below the upper edges 21 of said rails. In the saddles 41, the sections 42 of the saddles are rigidly secured to the rails whereby the section 42 extends upwardly therefrom as illustrated in Figs. 1 and 2 to form a cradle that faces rearwardly whereby a spool spindle may be moved therein and the section 43 swung rearwardly whereby the saddle will embrace the spindle.

In elevating the carriers with a structure such as illustrated in Figs. 1 to 7 inclusive, a platform 55 is supported on brackets 56 forwardly of the side panel members 15 and a conventional hand winch 57 is mounted on the platform 55 at one side and a power driven winch 58 is mounted on the platform at the opposite side. One end of a flexible member or rope 59 is secured to the hand winch drum 60 and a portion wound thereon with the rope extending rearwardly and over a pulley 61 rotatably mounted adjacent the rear ends of the rail 19, the pulley preferably being mounted on a pin 62 carried by the rail 19 and an arm 63 extending rearwardly from the adjacent vertical post 16. The rope then extends over a pulley 64 rotatably mounted on ears 65 extending upwardly from the link 27 connected to the carrier 26, the rope extending under the pulley 64 and then around a pulley 66 mounted on the arm 27 adjacent the end that is pivoted on the frame and substantially above a crossbar 67 that rigidly connects the arms 27 adjacent the pivoted ends. The rope 59 then extends transversely of the trailer and around a pulley 68 similarly arranged relative to the other arm 27 and then under a pulley 69 mounted on the arm 27 and substantially corresponding to the pulley 64 and up and over said pulley and over a pulley 70 substantially corresponding in position and mounting to the pulley 61 except on the opposite side of the trailer. The rope then extends to the power winch being wound on the drum 71 thereof and secured to said drum. The manual winch 57 and power winch 58 are so arranged that when one is to be operated, the drum of the other is held stationary and the operation of either winds the rope on the drum thereof to elevate the parallel links 27 and 28 to raise the carriers 25 and 26.

The forward end of the trailer preferably has a conventional adjustable leg 72 for supporting the forward end of the trailer when it is not connected to a towing vehicle. Leg members 73 are pivotally mounted as at 74 on each of frame members 3 and 4 and have socket shaped ends 75 at the upper ends thereof for positioning under the outer end portion of the links 27 for aiding in support of the carriers 25 and 26 and spool thereon during transportation.

Conventional spools 38 have a hole through the axis thereof and the spindles 37 are usually loose rods or tubes that are moved through the opening to provide a portion extending from each side of the spool. It is common practice to have collars 76 on the spindle for engaging the spool at the opposite ends thereof, said collars being fixed to the spindle by set screws or other suitable fastening devices. In order to apply tension to a cable being unwound from a spool on the trailer, one of the collars 76 fixed to the spindle is provided with a finger 77 which engages in an aperture 78 in the spool to key the spool to the spindle, and adjacent each spindle position on the trailer or one of the saddles for such position is a brake 79 preferably consisting of a brake band 80 having one end connected to an adjusting screw 81 threaded in a bracket 82 on the carriers or rails with the other end of said band removably connected to a bracket 83 whereby adjustment of the screw 81 will tighten or loosen the brake as desired to adjust the retarding force applied to the spool as cable is unwound therefrom.

Figure 5:
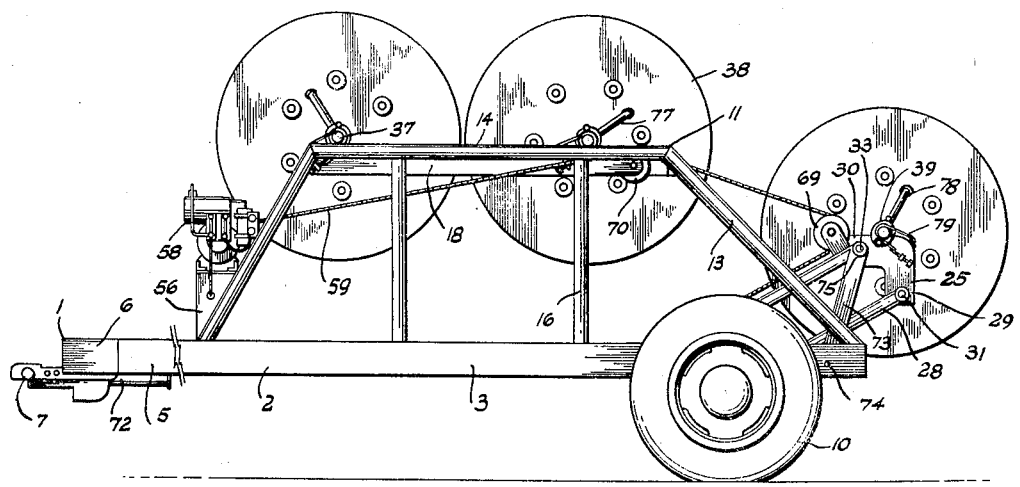
Fig. 5 is a side elevation of the spool trailer loaded for transportation of a plurality of spools.

In using a cable spool trailer constructed as described, either the winch 57 or 58 is operated to unwind the rope from the drum thereof to lower the carriers 25 and 26 substantially to the position shown in Fig. 1. Then the saddles 39 on the carriers are opened and a spool 38 with a spindle 37 therein rolled substantially to the position shown in Fig. 1 and then the saddle moved to embrace said spindle and the pin 49 inserted to hold the spool and spindle on the carriers. The winch from which the rope was unwound is operated to rewind the rope, the other winch serving as a dead end of the rope. As the rope is wound on the winch drum, the carriers are elevated with the links 27 and 28 maintaining the level position of the upper edges 35 of the carrier arms 30 to a position substantially as shown in Fig. 4. Then the saddles 39 are opened and swung downwardly and the saddles 40 are opened and swung downwardly whereby the saddles 39 and 40 are positioned below the upper edges of the carriers and rails respectively, and then the spool and spindle therefor are rolled forwardly until the spindle is positioned in the cradle of the saddle 41 which is in open position as shown in Fig. 1. The section 43 of the saddle 41 is then swung downwardly and the pin 49 inserted and the brake band positioned around the spindle. Then a winch 57 or 58 is operated to again lower the carriers and the steps repeated in applying another spool and elevating same to the rails, the second spool being rolled forwardly until the spindle is engaged in the saddle 40 and said saddle and brake bands fastened to hold the spool in position. The winch is again operated to lower the carriers and another spool and spindle rolled thereon, the saddles fastened around the spindle and the brake band secured as illustrated in Fig. 2. Then the winch is operated to raise the carriers above the upper ends of the legs 73 which are swung rearwardly to position the sockets 75 thereof below the bearing members on the outer ends of the arms 27 and the winch operated to lower the carriers until the bearing member is engaged in the socket to aid in supporting the spool as illustrated in Fig. 5. The spools are then ready to be moved to a place of use. At the place of use, the loading process may be reversed to unload the spools, or the cable on the spools may be attached to a suitable pulling mechanism and the brake bands 80 tightened whereby the cable may be unwound directly from the spools on the trailer.

In the form of the invention illustrated in Fig. 8, the frame 2, side panels 11 and 12, carriers 25 and 26, and parallel links 27 and 28 therefor are substantially the same as described relative to the structure in Figs. 1 to 7 inclusive. The operating structure differs in the mechanism for raising and lowering the carriers. In the modified form as shown in Fig. 8, an hydraulic extensible member 85 is mounted on one of the frame members and connected to an arm 86 that is fixed to an arm 27. In the illustrated structure, the extensible means consists of a cylinder 87 having one end pivotally connected as at 88 to the frame member 4 with a piston rod 89 extending from the other end of the cylinder and connected by a link 90 to the arm 86. The hydraulic cylinder arrangement is preferably of the double-acting type whereby suitable fluid under pressure is applied to the cylinder under selective control of a valve 91 whereby extension of the extensible means raises the carriers and contraction of the extensible means lowers the carriers.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A wheeled carriage having a main frame, longitudinally extending rails, means supporting the rails above the main frame substantially at opposite sides thereof with a lateral spacing for receiving a cable spool to be carried therebetween, said cable spool having an axial spindle extending therefrom transversely of said rails, said rails having ends terminating in spaced relation to one end of the main frame and cooperating therewith to provide an unobstructed opening for movement of a cable spool between said ends of the rails, carrier members adjacent said one end of the main frame and at each side thereof with a lateral spacing for receiving the cable spool therebetween, pairs of parallel links pivotally connected respectively to points along said main frame adjacent said one end thereof and to similarly spaced points on the carrier members for vertical swinging movement of the carrier members relative to the main frame, said carrier members each having portions thereon for alignment with the rails when the carrier members are in fully elevated position, means operatively connected with the pairs of parallel links for swinging same for raising and lowering the carrier members, means on the carrier members for holding a spool spindle during elevation of a spool on the carrier members, and stiff legs having one end pivotally mounted on opposite sides of the main frame between the pivotal connections of the pairs of parallel links and said one end of the main frame, said stiff legs having other ends engageable with the carrier members when in partially elevated position for cooperating with the pairs of parallel links in supporting the carrier members and spool thereon during transportation.

2. A wheeled carriage having a main frame, longitudinally extending rails, means supporting the rails above the main frame substantially at opposite sides thereof with a lateral spacing for receiving a cable spool to be carried therebetween, said cable spool having an axial spindle extending therefrom transversely of said rails, said rails having substantially horizontal track portions extending longitudinally thereof, said rails having ends terminating in spaced relation to one end of the main frame and cooperating therewith to provide an unobstructed opening for movement of a cable spool between said ends of the rails, carrier members adjacent said one end of the main frame and at each side thereof with a lateral spacing for receiving a cable spool therebetween, pairs of parallel links pivotally connected respectively to points along said main frame adjacent said one end thereof and to similarly spaced points on the carrier members for vertical swinging movement of said parallel links on said main frame, said carrier members each having a horizontal track thereon for alignment with the tracks on the rails when the carrier members are in fully elevated position, means operatively connected with the pairs of parallel links for swinging same for raising and lowering the carrier members, latch means on the carrier members for receiving and securing a spool spindle during elevation of a spool on the carrier members and releasable whereby when the carrier members are in elevated position the spool spindle may be rolled on to the rail tracks, latch means on the rails for receiving and anchoring a spool spindle thereon, and means on the main frame engageable with the carrier members for cooperating with the parallel links for holding the carrier members in partially elevated position.

3. A wheeled carriage for transporting cable spools having a spindle extending therefrom comprising, a main frame having spaced longitudinal members connected by transverse members spaced from the rear ends of the longitudinal members to form an open end thereof, upstanding laterally spaced side frames on the main frame and extending longitudinally thereof and being unobstructed therebetween at the rear to form an open end at said rear for movement of a cable spool therebetween, horizontal longitudinally extending rails fixed to each of the side frames above the main frame, said rails being laterally spaced for receiving a cable spool to be carried therebetween with the cable spool spindle extending therefrom transversely of said rails, said rails being adapted to be engaged by the spool spindle to support the spool in spaced relation to the main frame between the side frames, carrier members positioned substantially at the rear of the main frame adjacent opposite sides thereof with a lateral spacing for receiving a cable spool therebetween, said carrier members having portions thereon parallel with and substantially in the same vertical plane as the rails, pairs of parallel links pivotally connected respectively to points spaced along the sides of the main frame and to similarly spaced points on the carrier members whereby swinging movement of the parallel links will move the carrier members from a lowered position wherein the tracks thereon are below a spool spindle to permit a spool to be rolled on the ground between the carrier members to position the spindles on the carrier members to an elevated position to align the carrier members with the rails whereby the spools and spindles therefor may be rolled from the carrier members on to the rails, means on the carrier members for receiving and securing a spool spindle thereon, and means on the main frame engageable with the carrier members for cooperating with the parallel links for holding the carrier members in partially elevated position.

4. A wheeled carriage for transporting cable spools having a spindle extending therefrom comprising, a main frame, horizontal longitudinally extending rails, means supporting the rails above the main frame at opposite sides thereof, said rails being laterally spaced for receiving a cable spool to be carried therebetween with the cable spool spindle extending therefrom transversely of said rails, said rails being adapted to support the spool in spaced relation to the main frame, carrier members positioned substantially at the rear of the main frame adjacent opposite sides thereof with a lateral spacing for receiving the cable spool therebetween, said carrier members having portions thereon substantially in the same plane as the rails, means on the main frame supporting the carrier members for vertical swinging movement from a lowered position wherein the carrier members are below a spool spindle to permit a spool to be rolled on the ground between the carrier members to position the spindles on the carrier members to an elevated position to align the carrier members with the rails whereby the spools and spindles therefor may be rolled from the carrier members on to the rails, latch means on the carrier members including pivotally connected sections adapted to embrace a spool spindle, means pivotally connecting one of the sections to the carrier members below the upper edges thereon whereby the latch means may be swung below said upper edges out of the path of the spool spindle, means operatively connected with the carrier members for swinging same to raise and lower the carrier members, and latch means on the rails including pivotally connected sections adapted to be secured in spindle-embracing position to hold a spool and spindle against relative longitudinal movement on the rails.

5. A wheeled carriage for transporting cable spools having a spindle extending therefrom comprising, a main frame having spaced longitudinal members connected by transverse members spaced from the rear ends of the longitudinal members to form an open end thereof, upstanding laterally spaced side frames on the main frame and extending longitudinally thereof and being unobstructed therebetween at the rear to form an open end at said rear, horizontal longitudinally extending rails fixed to each of the side frames above the main frame, said rails being laterally spaced for receiving a cable spool to be carried therebetween with the cable spool spindle transversely of said rails, said rails having track means thereon adapted to be engaged by the spool spindle to support the spool in spaced relation to the main frame between the side frames, carrier members positioned substantially at the rear of the main frame adjacent opposite thereof with a lateral spacing for receiving a cable spool therebetween, said carrier members having horizontal tracks thereon parallel with and substantially in the same vertical plane as the tracks on the rails, pairs of parallel links pivotally connected respectively to points spaced along the sides of the main frame and to similarly spaced points on the carrier members whereby swinging movement of the parallel links will move the carrier members from a lowered position wherein the tracks thereon are below a spool spindle to permit a spool to be rolled on the ground between the carrier members to position the spindles on the carrier member track means to an elevated position to align the track means on the carrier members with the track means on the rails whereby the spools and spindles therefor may be rolled from the carrier members on to the tracks on the rails, a winch supported on the main frame in spaced relation to the carrier members, a flexible line having one end connected and wound on the winch and the other end fixed relative to said main frame, means operatively connecting the intermediate portion of the flexible line with the pairs of parallel links whereby operation of the winch will swing said parallel links to raise and lower the carrier members, and means on the rails and carrier members adapted to be secured in spindle-embracing position to resist rotation of the spool and spindle.

6. A wheeled carriage for transporting cable spools having a through axial bore with a spindle extending therethrough and connected to the spool for rotation therewith comprising, a main frame having spaced longitudinal members connected by transverse members spaced from the rear ends of the longitudinal members to form an open end thereof, upstanding laterally spaced side frames on the main frame and extending longitudinally thereof and being unobstructed therebetween at the rear to form an open end at said rear, horizontal longitudinally extending rails fixed to each of the side frames above the main frame, said rails being laterally spaced for receiving a cable spool to be carried therebetween with the spool spindle transversely of said rails, said rails having track means thereon adapted to be engaged by the spool spindle to support the spool in spaced relation to the main frame between the side frames, carrier members positioned substantially at the rear of the main frame adjacent opposite sides thereof with a lateral spacing for receiving a cable spool therebetween, said carrier members having horizontal tracks thereon parallel with and substantially in the same plane as the tracks on the rails, pairs of parallel links pivotally connected respectively to points spaced along the sides of the main frame and to similarly spaced points on the carrier members whereby swinging movement of the parallel links will move the carrier members from a lowered position wherein the tracks thereon are below a spool spindle to permit a spool to be rolled on the ground between the carrier members to position the spindles on the carrier member track means to an elevated position to align the track means on the carrier members with the track means on the rails whereby the spools and spindles therefor may be rolled from the carrier members on to the tracks on the rails, latch means on the carrier members including pivotally connected sections adapted to embrace a spool spindle, means pivotally connecting one of the sections to the carrier members below the tracks thereon whereby the latch means may be swung below the track means out of the path of the spool spindle, means operably connected with the pairs of parallel links for swinging same to raise and lower the carrier members, latch means on the rails including pivotally connected sections adapted to be secured in spindle-embracing position to hold a spool and spindle against relative longitudinal movement on the rails, and friction brake means on the carrier members and rails and engaging the spool spindles to resist rotation of the spools, and stiff legs having one end pivotally mounted on opposite sides of the main frame between the pivotal connections of the pairs of parallel links and said rear end of the main frame, said stiff legs having other ends engageable with the carrier members when in partially elevated position for cooperating with the pairs of parallel links in supporting the carrier members and spool thereon during transportation.

7. A wheeled carriage for transporting cable spools having a spindle extending therefrom comprising, a main frame having spaced longitudinal members connected by transverse members spaced from the rear ends of the longitudinal members to form an open end thereof, upstanding laterally spaced side frames on the main frame and extending longitudinally thereof and being unobstructed therebetween at the rear to form an open end at said rear, horizontal longitudinally extending rails fixed to each of the side frames above the main frame, said rails being laterally spaced for receiving a cable spool to be carried therebetween with the spindle of the spool transversely of said rails, said rails having tracks means thereon adapted to be engaged by the spool spindle to support the spool in spaced relation to the main frame between the side frames, carrier members positioned substantially at the rear of the main frame adjacent opposite sides thereof with a lateral spacing for receiving a cable spool therebetween, said carrier members having horizontal tracks thereon parallel with and substantially in the same plane as the tracks on the rails, pairs of parallel links pivotally connected respectively to points spaced along the sides of the main frame and to similarly spaced points on the carrier members whereby swinging movement of the parallel links will move the carrier members from a lowered position wherein the tracks thereon are below a spool spindle to permit a spool to be rolled on the ground between the carrier members to position the spindles on the carrier member track means to an elevated position to align the track means on the carrier members with the track means on the rails whereby the spools and spindles therefor may be rolled from the carrier members on to the tracks on the rails, latch means on the carrier members including pivotally connected sections adapted to embrace a spool spindle, and means pivotally connecting one of the sections to the carrier members below the tracks thereon whereby the latch means may be swung below the track means out of the path of the spool spindle, a manual winch, a power-driven winch, means supporting the manual and power-driven winch in spaced relation on the winches, a flexible line having ends connected on the winches, means movably connecting the intermediate portion of the flexible line with the pairs of parallel links whereby operation of either the manual or power winch will swing the parallel links to raise and lower same, and latch means on the rails including pivotally connected sections adapted to be secured in spindle-embracing position to hold a spool and spindle against relative longitudinal movement on the rails.

8. A wheeled carriage for transporting cable spools having a through axial bore with a spindle extending therethrough and connected to the spool for rotation therewith comprising, a main frame having spaced longitudinal members connected by transverse members spaced from the rear ends of the longitudinal members to form an open end thereof, upstanding laterally spaced side frames on the main frame and extending longitudinally thereof and being unobstructed therebetween at the rear to form an open end at said rear, horizontal longitudinally extending rails fixed to each of the side frames above the main frame, said rails being laterally spaced for receiving a cable spool to be carried therebetween with the spindle of the spool transversely of the rails, said rails having track means thereon adapted to be engaged by end portions of the spool spindle to support the spool in spaced above relation to the main frame between the side frames, carrier members positioned substantially at the rear of the main frame adjacent opposite sides thereof with a lateral spacing for receiving a cable spool therebetween, said carrier members having horizontal tracks thereon parallel with and substantially in the same vertical plane as the respective tracks on the rails, pairs of parallel links pivotally connected respectively to points spaced along the sides of the main frame and to similarly spaced points on the carrier members with said pairs of links between the respective carrier members and sides of the main frame whereby swinging movement of the parallel links will move the carrier members from a lowered position wherein the tracks thereon are below a spool spindle to permit a spool to be rolled on the ground between the carrier members to position the spindles on the carrier member track means to an elevated position to align the track means on the carrier members with the track means on the rails whereby the spools and spindles therefor may be rolled from the carrier members on to the tracks on the rails, latch means on the carrier members including pivotally connected sections adapted to embrace the spool spindle to retain the spool thereon, means pivotally connecting one of said latch sections to the carrier members below the tracks thereon whereby the latch means may be swung below the track means out of the path of the spool spindle for rolling the spool therefrom, a manual winch, a power-driven winch, means supporting the manual and powed-driven winch in spaced relation on the frames, a continuous flexible line having one end connected and wound on one and the other end connected and wound on the other of the winches, means guiding the intermediate portion of the flexible line to the parallel links, means movably connecting the intermediate portion of the flexible line with the pairs of parallel links whereby operation of either the manual or power winch will swing the parallel links to raise and lower the same, latch means on the rails including pivotally connected sections adapted to be secured in spindle-embracing position to hold a spool and spindle against relative longitudinal movement on the rails, and friction brake means on the carrier members and rails and engaging the spool spindles to resist rotation of the spools.

References Cited in the file of this patent

UNITED STATES PATENTS

| | | |
|---|---|---|
| 152,173 | Rowland | June 16, 1874 |
| 480,646 | York et al. | Aug. 9, 1892 |
| 527,879 | Potter | Oct. 23, 1894 |
| 1,448,006 | Seymour | Mar. 13, 1923 |
| 1,864,676 | Smith et al. | June 28, 1932 |
| 2,620,201 | Brady | Dec. 2, 1952 |